(12) United States Patent
Fendt et al.

(10) Patent No.: US 6,823,020 B1
(45) Date of Patent: Nov. 23, 2004

(54) SIGNALING OUTPUT STAGE FOR GENERATING DIGITAL VOLTAGE SIGNALS ON A BUS SYSTEM

(75) Inventors: Guenter Fendt, Schrobenhausen (DE); Norbert Mueller, Schrobenhausen (DE); Michael Bischoff, Adelschlag (DE); Johannes Rinkens, Ingolstadt (DE); Stefan Schaeffer, Schrobenhausen (DE); Werner Nitschke, Ditzingen (DE); Otto Karl, Leonberg (DE); Joachim Bauer, Oberstenfeld (DE)

(73) Assignees: Conti Temic microelectronic GmbH, Nuremberg (DE); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,831
(22) PCT Filed: Mar. 6, 1999
(86) PCT No.: PCT/EP99/01460
§ 371 (c)(1),
(2), (4) Date: Aug. 8, 2000
(87) PCT Pub. No.: WO99/50996
PCT Pub. Date: Oct. 7, 1999

(30) Foreign Application Priority Data
Mar. 19, 1998 (DE) .......................... 198 13 952

(51) Int. Cl.[7] .......................... H04L 25/00; H04B 3/46; H04Q 1/20
(52) U.S. Cl. ....................... 375/257; 375/224
(58) Field of Search ................. 307/112–144; 361/1–138; 375/257, 377, 224; 326/21–34, 9–15; 327/1–508; 370/216–228

(56) References Cited

U.S. PATENT DOCUMENTS

| | | | | |
|---|---|---|---|---|
| 4,385,394 A | * | 5/1983 | Pace .......................... | 375/257 |
| 4,748,426 A | * | 5/1988 | Stewart .................... | 333/22 R |
| 5,357,518 A | * | 10/1994 | Peter .............................. | 714/4 |
| 5,689,397 A | * | 11/1997 | Pohl et al. .................. | 361/115 |
| 5,696,777 A | | 12/1997 | Hoffsaess | |
| 5,765,031 A | | 6/1998 | Minuth et al. | |
| 5,781,585 A | * | 7/1998 | Dorner et al. .............. | 375/224 |
| 6,034,995 A | * | 3/2000 | Eisele et al. ................ | 375/257 |

FOREIGN PATENT DOCUMENTS

| | | |
|---|---|---|
| DE | 4403899 | 8/1995 |
| DE | 19503460 | 3/1996 |
| DE | 19523031 | 12/1996 |

* cited by examiner

*Primary Examiner*—Stephen Chin
*Assistant Examiner*—Jason M. Perilla
(74) *Attorney, Agent, or Firm*—W. F. Fasse; W. G. Fasse

(57) ABSTRACT

An arrangement for generating digital signals on first and second bus lines is tolerant of most line faults, and includes modules connected to both lines, an upper switch between a first potential and the first line, a middle switch between the two lines, and a lower switch between the second line and a second potential lower than the first potential. The switches are controlled to generate digital signals as the potential difference between the two lines. If a fault potential (e.g. a short to ground or other potential) arises on one line, then the switches drive the non-faulty line to provide the required signals relative to the fault potential on the faulty line. Closing the middle switch ensures that the two lines are at the same potential for a low signal. This arrangement is for is signaling in various bus systems, e.g. in vehicle occupant protection systems in motor vehicles.

32 Claims, 3 Drawing Sheets

|  | $L_1 u. L_2$ = float. $B_1$ High → Low | $L_1 = \varphi_3$ $B_2$ High  Low | $L_2 = \varphi_3$ $B_3$ High  Low | $L_2 = \varphi_2$ $B_4$ High  Low |
|---|---|---|---|---|
| $S_1$ | zu  auf  auf | auf  auf | zu  auf | zu  auf |
| $S_2$ | auf  zu  zu | auf  zu | auf  zu | auf  zu |
| $S_3$ | zu  zu  zu | zu  auf | auf  auf | auf  auf |

FIG. 2

|  | $L_1$ |  |  |  |
|---|---|---|---|---|
| $L_2$ | Float. | $\varphi_1$ | $\varphi_2$ | $\varphi_3$ |
| Float. | $B_1$ | $B_2$ | x | $B_2$ |
| $\varphi_1$ | x | x | x | x |
| $\varphi_2$ | $B_4$ | x | x | x |
| $\varphi_3$ | $B_3$ | x | x | x |

FIG. 3

SIGNALING OUTPUT STAGE FOR GENERATING DIGITAL VOLTAGE SIGNALS ON A BUS SYSTEM

FIELD OF THE INVENTION

The invention concerns a signalling output stage for generating digital voltage signals on a bus system connecting a central processor unit via two signal lines to a plurality of modules.

BACKGROUND INFORMATION

According to the state of the art, so-called push-pull-signalling output stages with two sets of transistor-switching equipment are usually used as signalling output stages, connecting a line either with the supply voltage or to ground. In general, short circuits to an interference potential (e.g. to ground), the supply voltage, or another third potential may lead to an attenuation of the necessary :signal amplitude and thus to faults in the signal recognition up to and including the failure of the signalling output stage.

In order to prevent this, an integrated transmit and receive circuit is to be taken from DE 196 11 944 A1 for coupling a control unit to a two-wire bus, where a test device for fault recognition on the bus system lines is provided and where, in addition to a standard operating mode, further different operating modes are provided which, in the event of a fault, allow communication adjusted to the actual fault type. This is known as a fault-related change-over of the circuit termination elements. Employing the switching equipments in FIG. 3a makes it possible, if signal reception is no longer possible with VCC, to initially apply CAN_L to Vbatt, instead of using termination resistors 16 and 17 which in normal operation mode apply CAN_H to GND and CAN_L to VCC. Moreover, it is also possible to deploy very low current sources 26 and 27 permitting a current-limited retention of the signal reception. Column 7, starting at line 56, indicates that in the event of a defect, signalling can be abandoned as the transmission signal TXD can no longer have any effect on the bus. The change-over thus mainly affects the reception of signals in a faulty bus, but not their transmission.

DE 39 01 589 A1 describes the coupling-up of a bus participant, in which a resistor network assures that even in the presence of faults on the bus lines the data existing on the data bus can always be recognized. Here again, only those faults which occur during reception, and not at the time of transmission, are being considered, even though transmission outputs are also connected by means of this resistor network, but being connected in a rigid way and consequentially not adaptable to the fault type.

DE 195 09 133 A1 also describes a reception device compensating bus faults, that changes between one- and two-wire reception.

Therefore, these publications may suggest the various fault types, particularly short circuits to supply voltages or ground potential, but they do not consider a signal generation adapted thereto.

DE 44 03 899 A1 teaches such a generic signalling output stage in a device for serial data transmission between at least two stations. Thus, FIG. 2 shows a signalling output stage where an upper switching equipment or device (T2) is connected between a first voltage potential (V2) and a first line (S+), and a lower switching equipment or device (T3) is connected between a second voltage potential (ground) and the second line (S−). In addition to this, various operating modes are provided for the case of a fault on one of the lines, which enable a signal generation adapted to the type of the fault. Checking the lines for short circuits, and signalling control, are implemented by direct technical switching or circuit means, that is, shifting voltage potentials on the lines will directly lead to different electrical conditions and thus to a different signalling. Thus, an independent signalling is provided for on both lines S+ and S−, that is, line S+ is not only connectable to V2 via R5,T2, but it can also be permanently grounded, via the high ohmic resistance R7, while S−, via R4, highly ohmically quiescently rests at V2 and can be pulled to ground by switching T3.

In any emergency, signalling can thus be performed both just via S+ on its own as well as via S− on its own. In normal operation mode, both lines feature straight inverse signals to one other (compare FIG. 4a). In addition, both lines feature a quiescent potential.

In correspondence to this, DE 195 03 460 C1 also describes a failure tolerant output stage of the generic type which features a test device (condition detection module) designed for the detection of faults and their particular type, as well as a transmission module with different operating modes, where again, however, the first and second line of the bus system can signal independently of one another, because both lines each have their own connection to a high and a low voltage potential, as can be seen from FIG. 2.

SUMMARY OF THE INVENTION

Based on this state of the art, this invention has the task to describe a further bus failure-tolerant signalling output stage, that does not have a fixed quiescent current load and yet provides a simple way, at least for the majority of possible faults, to continue signal generation in a different operating mode. Additionally, a particularly preferred application within a bus system is to be stated, where the certainty of data transmission being maintained, even in the event of any faults occurring on the bus system, will be further improved.

The above stated task is achieved according to the invention in a signalling output stage for the generation of digital voltage signals on a bus system with a central processor unit and a number of modules, connected to it by means of two lines, where the digital voltage signals assume one high voltage level and a corresponding lower voltage level. An upper switching equipment between a first voltage potential and the first line, as well as a lower switching equipment between a second, comparatively lower voltage potential and the second line are provided for. The central processor unit features a test device, by means of which faults on the lines, particularly short-circuits to a voltage potential can be detected. A standard operating mode is provided, in which signal generation is effected by the high voltage level being generated by closing the upper and lower switching equipments, and the low voltage level by opening at least the upper switching equipment. In case of a fault, additional different operating modes are provided for, which in spite of the fault enable digital voltage signals to be generated in such a way that they are adjusted to the type of fault. Further, a middle switching equipment is provided between the first line and the second line, by means of which signal generation will be maintained at least in the case of a fault on one line.

The above stated task is further achieved according to the invention in a circuit arrangement including the inventive signalling output stage, within a bus system, and further comprising the following features. All of the modules are further furnished with at least one short-circuit testing device for the two lines. The testing device is adapted to check the output of the respective line for an effective short-circuit, namely an effective resistance which is too low. For each of the two lines, there is further provided one switching device located between an input and an output of the respective line. The switching devices are respectively adapted to switch a connection between the input and the output of each respective one of the two lines, only after a test has been executed at the respective output by means of the respective short-circuit testing device and if the test has proven the absence of a short-circuit.

Advantageous further developments and embodiments of the invention are as set forth in the claims following this written description.

By using the two lines and three sets of switching equipment, it will become possible to drive the modules jointly via both lines, or individually, via only one of the lines, if a fixed interference potential is being applied to the other line. Both lines can assume either of the two voltage potentials.

If a fixed interference potential, e.g. to ground or supply voltage, is applied to a line, signalling or signal transmission will be implemented as a potential difference between the fixed interference potential of the short-circuited line and the line not subject to interference, the potential of which will be controlled accordingly.

Although the expenditure will initially be greater, due to the three sets of switching equipment and the two lines, this really becomes negligible if the new and varied options for signal generation, as well as the transmission certainty gained, are taken into account.

The different processes for generating the digital voltage signal are each optimized for one particular operating mode. A ground fault as well as a short circuit to a third voltage potential in one of the two lines do not necessarily lead to a failure of the modules or the signalling output stage. The relevant particular operating mode will be detected by means of a testing device, and the signalling output stage will be driven according to the test result, that is, the processes used for generating the voltage signals will be changed over., if necessary.

In particular, for a bus system within a vehicle occupant protection system, e.g. as used in a motor vehicle, in which—via the bus system—control modules for triggering vehicle occupant protection devices are connected to one another, and to the central processor unit, in a way that allows them to communicate, protection of this kind against simple line short circuit faults is essential. These short circuits can occur particularly against the ground potential, which is generally routed along the metal vehicle body or against the operating supply voltage, which is conducted in a vehicle's cable harnesses as a supply voltage network on an immediately adjacent basis. Due to the exposure to extreme mechanical stresses, a possible destruction of the cable insulation found in motor vehicles can never be entirely excluded. In particular, during the course of an accident, the cables can be subjected to destruction. In order to be able to still transmit the signals, that are relevant for the safety of vehicle occupants, to the control modules in order to trigger the vehicle occupant protection devices, the option to transmit signals even in the event of faults on one of the lines, using the respective other line represents a significant progress. In order to still be able to transmit signals even in the event of a short circuit to the supply voltage, e.g. battery power supply voltage, it is advantageous to select the two voltage potentials applied to the switching equipment such that a potential difference arises which is still detectable as a high voltage level. The higher of the two voltage potentials should thus be increased by a corresponding amount compared to the supply system voltage. Naturally, applications with regard to other signalling tasks are not excluded.

BRIEF DESCRIPTION OF THE DRAWINGS

The invention will be explained below by means of an embodiment example and the following figures. Short description of the figures:

FIG. 2 Overview over the possible signalling processes in accordance with the invention.

FIG. 3 Selection decision table with regard to the signalling processes used, based on the measured operating conditions or modes.

DETAILED DESCRIPTION OF THE INVENTION

Figure 1:
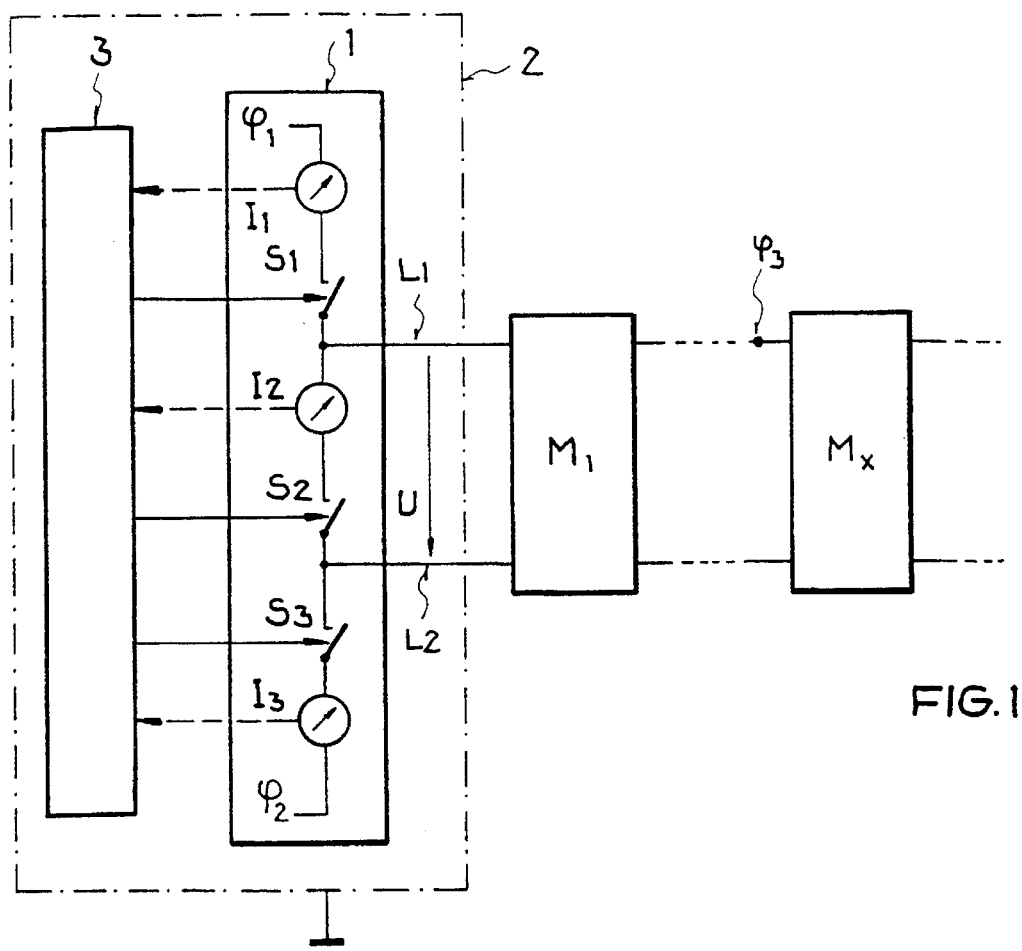
FIG. 1 Block diagram of a bus system featuring a signalling output stage with three sets of switching equipment and two lines in accordance with the invention.

In FIG. 1, the bus system complete with a signalling output stage 1 is initially shown in the form of a block diagram. In this embodiment example, this signalling output stage forms a component part of the central processor unit 2, but in principle it can also be used within the various individual modules, if these are to transmit actively, and thus require a signalling output stage. Via the two lines L1 and L2, the modules M1 . . . Mx are connected to the central processing unit 2, which is effected such that the modules are arranged respectively in parallel one behind another between the two lines L1 and L2. The individual modules M1 . . . Mx respectively receive the arising particular voltage potential difference U between the first and second lines L1, L2. A high potential difference U between L1 and L2 is considered to be a high voltage level, in analogy to this a low potential difference, particularly a zero voltage, is considered to be a low voltage level. The assignment of a digital logical value (logical 0 or 1) is independent of this. Thus, particularly, a high voltage level can be used as the quiescent condition to ensure that the supply voltage is supplied to the individual modules M1 . . . Mx, even if no signals are being transmitted.

The signalling output stage 1 comprises the three sets of switching equipment or switching devices S1, S2 and S3, that are respectively located between a first voltage potential $\phi 2$, the line L1, the line L2, and a second voltage potential $\phi 2$, which is defined as the lower one of the two. This determination is to be understood to be merely a precondition for the unambiguousness of the processes to be described in the following. The switching equipments or devices S1 to S3 are schematically shown as switches in FIG. 1, in reality, however they are of course embodied in the form of the usual known transistor switches.

In addition, and by way of example, FIG. 1 shows a short circuit of the first line L1 to a third voltage potential $\phi 3$. Such short circuits to ground or to a third voltage potential occur (e.g. due to insulation faults) on lines L1 and L2, as well as possibly on spatially adjacent components and conductors. Since the case or housing is used as the electrical ground potential, particularly in the field of motor vehicle electronics, even a slight defect in the line insulation may lead to a permanent short circuit to ground. Even a short circuit e.g. to the operation supply voltage potential may occur in a different line that is similarly insufficiently insulated.

With open switching equipment S1, S2, S3, the lines L1 and L2 are free of potential and floating in normal operation mode, so that both lines—with an appropriate combination of switching equipment states—can assume both the first as well as the second voltage potentials. Only when a short circuit occurs on a line, this will then be subject to a fixed potential (second or third voltage potential), such that the signalling needs to take this into account.

The signalling output stage 1 or the respective sets of switching equipment S1, S2, and S3 thereof are driven by a control device 3 of the central processor unit 2. Moreover, in this embodiment example, all sets of switching equipment S1–S3 comprise a respectively assigned current testing device I1–I3. This will determine the current which respectively flows through the switching equipment, and compares the determined current to a permissible value range. If this value range is exceeded, the control device 3 connected with these testing devices I1 to I3 will determine whether the signalling process is to be changed. The selection decision used in this case will be explained in more detail in connection with FIG. 3. The testing devices I1 to I3 are to be used to monitor the operating mode or condition of the switching equipments S1 to S3, as well as of the lines L1 and L2; in particular, the occurrence of a short circuit on one of the lines to a third voltage potential or ground is to be detected. Naturally, it is also possible—instead of detecting the current flow through the switching equipments—to detect the voltage potentials of the two lines L1 and L2 by means of voltage testing devices not shown here, and to compare these in accordance with adapted value ranges.

The special advantages provided by this signalling output stage can also be seen with regard to the signalling processes which have now become possible by this means, and which will be explained as follows by means of the following overview in FIG. 2.

Thus, in the event of a short circuit in one line, signalling will fundamentally still be possible in almost all cases, with one exception, in that the now short-circuited line is in principle used as a fixed reference potential and the respective other line is switched as required for the signalling. Using the switching equipment S2 located between the lines L1 and L2, it will now be possible to generate the low voltage level even if one of the lines has a fixed potential. This is done such that the switching equipment S2 will then be closed, respectively, and, via this equipment S2, the line which is still floating will be able to assume the voltage potential of the defective line, such that a potential difference U arises across the modules M1 . . . Mx which corresponds to the low voltage level. On a line with a fixed potential, the high voltage level is respectively generated as a potential difference U of the first or second voltage potential with reference to this fixed potential ($U=\phi1-\phi3$ or $U=\phi2-\phi3$). The sign of the potential difference can fundamentally be accounted for by means of a rectifying circuit at the inputs of the modules M1 . . . Mx.

The sets of switching equipment S1 to S3 are again arranged analogous to FIG. 1. The switching states of the same are marked "closed" for the conductive state of the respective switching equipment, and "open" for the non-conductive state. "High" marks the high voltage level, and, correspondingly, "low" stands for the low voltage level. In operating mode B1, the change from "high" to "low" is additionally discussed by means of the arrow "→".

In operating mode B1, the lines L1 and L2 are floating, that is, free of potential, if all three sets of switching equipment S1 . . . S3 are open. In this mode, both lines can thus be actively used for signalling with regard to the switching equipment position shown, "high" is provided by the potential difference from $\phi1$ and $\phi2$.

When changing from High→Low, while S1 is in its opening movement, S2 will be initially closed for at least a short time, but for the maintenance of a low voltage level it should preferably be kept closed. Initially, the capacitive parts of the switching equipment, lines, and modules will be more quickly discharged due to the short circuit via S2, and the switching speed will be increased. In the subsequent operating modes B2 . . . B4, this changeover will no longer be shown, since it can ultimately be applied independently from the individual signalling processes. The switching equipment S3 is not absolutely necessary for the changeover and for achieving the low is voltage level, but it can advantageously be closed and L2 set to $\phi2$, which is usually the ground potential. The only exception will be the operating mode, in which L2 is shorted to $\phi3$, since closing S3 would lead to a short-circuit.

In the overview in FIG. 2, the operating mode B2 is initially shown as the signalling for a short-circuit from L1 to the third voltage potential $\phi3$, which e.g. could be the operating supply voltage. In this case, the signalling is effected through S2 and S3. The high voltage level can then be derived as the potential difference from $\phi3$ and $\phi2$, "low" —as usual—by means of the short-circuit of L1 and L2 via S2. The only reason why the state of S1 is preferably permanently open is provided by power dissipation considerations, as otherwise a short-circuit would arise from $\phi3$ to $\phi1$. The signalling shown for this case can obviously also be applied to a short-circuit from L1 to $\phi1$.

The signalling for a short-circuit from L2 to the third voltage potential $\phi3$ is shown as operating mode B3. This signalling is performed via S1 and S2, with "high" being the potential difference between $\phi1$ (S1 closed) and $\phi3$, and with "low" being effected by a short-circuit of L1 and L2 via S2. In order to avoid excessive power dissipation caused by a short-circuit at S3, S3 will preferably be in a permanent open state.

The signalling for a short-circuit from L2 to p2 is shown as operating mode B4. Signalling is again effected via S1 and S2, but in this case "high" —as for the standard operating mode—is derived as the potential difference between $\phi1$ (S1 closed) and $\phi2$, but L2 remains fixed on the second voltage potential $\phi2$. "Low" is again generated by means of a short-circuit of L1 and L2 via S2. The state of S3 is not crucial in this operating mode B4, e.g. set to "open" in this embodiment example.

FIG. 3 shows a selection decision table for the applied signalling process based on the measured operating modes or conditions. The example shown here was based on a measurement of the voltage potential of lines L1 and L2. Those conditions that cannot be rectified or corrected by means of the signalling output stage alone are crossed out; i.e. the double faults and the following two operating modes, namely the short-circuit of L1 to $\phi2$ as well as that of L2 to $\phi1$, that is, the respective opposite voltage level with reference to the applied external switching equipment (S1, S3). The currents in the individual current testing devices I1 to I3 for switching equipments S1 to S3 can be clearly assigned to the respective operating modes, e.g. in the case of an excessive current in I3, L2 is set to φ1 or φ3; if, in addition, the current in I2 is also excessive, L1 will be set to one of these voltage potentials, and if, in spite of the fact that S3 and S1 are closed, there is no current flow in I3, but rather in I1, there is a short-circuit to φ2 in one of the lines L1 or L2. This can also be distinguished by closing only S1. If even now the current in I1 is excessive, L1 is set to φ2. The floating condition will always be detected by the potential difference between L1 and L2, which in this case always equals zero for the closed switching equipment S2.

Figure 4:
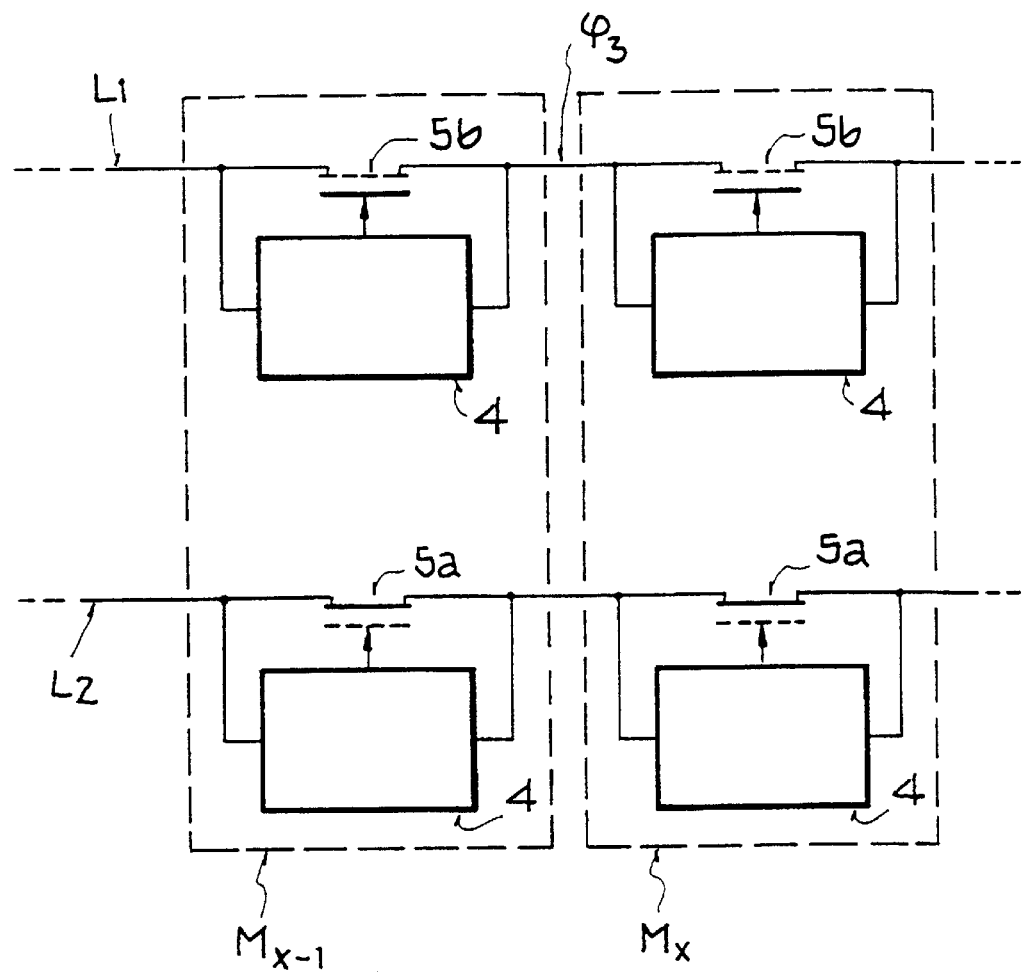
FIG. 4 Details of two modules featuring longitudinal switches for limiting the effect of a short circuit.

FIG. 4 now shows a further development of the invention by using modules with longitudinal switches for isolating a short-circuit on the line. In this way, as will be explained below, it will nonetheless be possible to effect a signalling even for those operating modes which so far could not be handled by the signalling output stage alone, if a bus system is used wherein at least one short circuit testing device 4 is provided for the two lines L1, L2 in respect of all modules M, and wherein this testing device tests the output of the respective line for an effective short-circuit, namely a resistance value effective there which is too low. For each of the two lines L1, L2 a switching device 5 is respectively provided between the input and the output of a line in a module (Mx, Mx-1), that can be conductive (5*a*) or non-conductive (5*b*).

Using these so-called longitudinal switches 5 with short-circuit testing device 4, however, it is possible to limit a short-circuit to a line section between two modules (Mx, Mx-1), and the signalling outside this line section can continue unchanged in that the switching devices 5*a* (closed), 5*b* (open) only then make a respective connection (5*a*) between the input and the output of each of the two lines, once a test has been performed at the respective output by means of the short-circuit testing device(s) 4, and if this test has proven the absence of a short-circuit.

The use of such longitudinal switches further increases the certainty of signal transmission and can be applied advantageously for the signalling output stage, as it permits the respective non-defective line to be used for signal transmission. Within the modules M, an internal ground potential is provided for, against which the signalling voltage potentials then build up a potential difference.

What is claimed is:

1. Signalling output stage (1) for the generation of digital voltage signals on a bus system with a central processor unit (2) and a number of modules (M), connected to it by means of two lines (L1, L2), where the digital voltage signals assume one high voltage level and a corresponding lower voltage level,
   a) an upper switching equipment (S1) between a first voltage potential (φ1) and the first line (L1), as well as a lower switching equipment (S3) between a second, comparatively lower voltage potential (φ2) and the second line (L2) is provided for,
   b) the central processor unit features a test device (I1 . . . I3), by means of which faults on the lines, particularly short-circuits to a voltage potential can be detected,
   c) with a standard operating mode (B1) being provided, in which signal generation is effected by the high voltage level being generated by closing the upper and lower switching equipments (S1, S3), and the low voltage level by opening at least the upper switching equipment (S1), and
   d) in case of a fault, additional different operating modes (B2–B4) being provided for, which in spite of the fault enable digital voltage signals to be generated in such a way that they are adjusted to the type of fault, wherein
   e) a middle switching equipment (S2) is provided for between the first line (L1) and the second line (L2), by means of which signal generation will be maintained at least in the case of a fault on one line.

2. Signalling output stage according to claim 1, wherein
   a) the first and second voltage potential ((φ1, φ2) are chosen with regard to a third voltage potential (φ3), in particular a supply voltage, such
   a1) that a potential difference (U) between the third (φ3) and one of the two other voltage potentials (φ1 or φ2) is still detected as a high voltage level by the modules (M), and
   b) at least three additional operating modes (B2, B3, B4) are provided in addition to the standard operating mode (B1),
   b1) a second operating mode (B2) is provided, where the first line (L1) is shorted to the third voltage potential (φ3), in which signal generation is effected such that by closing the lower switching equipment (S3) and opening the middle switching equipment (S2) a potential difference (U=φ3–φ2) resulting from the third and the second voltage potential is generated across the modules (M), which potential difference is equated with the high voltage level by the modules (M) and where, by opening the lower (S3 open) and closing the middle switching equipments (S2 closed), a difference (U=φ3–φ3=0) corresponding to the low voltage level is generated across the modules (M),
   b2) a third operating mode (B3) is provided, where the second line is shorted to the third voltage potential (L2=φ3), in which signal generation is effected such that by closing the upper switching equipment (S1 closed) and opening the middle switching equipment (S2) a potential difference (U 32 φ1–φ3) resulting from the first and the third voltage potential is generated across the modules (M), which potential difference is equated with the high voltage level by the modules (M) and where, by opening the upper (S1 open) and closing the middle switching equipments (S2 closed), a potential difference (U) corresponding to the low voltage level is generated across the modules (M),
   b3) a fourth operating mode (B4) is provided, where the second line is shorted to the second voltage potential (L2=φ2) and where signal generation is effected such that by closing the upper switching equipment (S1) and opening the middle switching equipment (S2) the high voltage level is generated across the modules (M), and where, by opening the upper and closing the middle switching equipments (S1, S2) a potential difference (U=φ2–φ2=0) corresponding to the low voltage level is generated across the modules (M).

3. Signaling output stage according to claim 1, wherein, if all three sets of switching equipment (S1 . . . S3) are open, both lines (L1, L2) are free of any potential, and in particular not shorted to ground.

4. Signaling output stage according to claim 1, wherein the second voltage potential (φ2) represents the ground potential.

5. Signalling output stage according to claim 1, wherein the modules (M) are arranged parallel to one another between the first and the second lines (L1, L2).

6. Signaling output stage according to claim 1, wherein, in all operating modes (B1–B4), the middle switching equipment (S2) between the first and the second lines (L1, L2) is closed for at least a short time when changing over from the high voltage level to the low voltage level, whilst at least the upper switching equipment (S1), is open.

7. Signaling output stage according to claim 1, wherein, in a normal operating mode (B1), at low voltage level the lower switching equipment (S3) is closed.

8. Signaling output stage according to claim 2, wherein, in the fourth operating mode (B4), the lower switching equipment (S3) will be opened for both voltage levels.

9. Signaling output stage according to claim 2, wherein, in the second operating mode (B2) the upper switching equipment (S1) will be opened for both voltage levels.

10. Signaling output stage according to claim 2, wherein, in the third operating mode (B3) the lower switching equipment (S3) will be opened for both voltage levels.

11. Signaling output stage according to claim 1, wherein the testing device measures current conductivity with one switching equipment (S1 . . . S3) being closed and/or measures the voltage potential of the two lines (L1, L2).

12. A circuit arrangement including the signaling output stage according to claim 1, within a bus system, and further comprising the following features:
   a) all of the modules are further furnished with at least one short-circuit testing device (4) for the two lines (L1, L2), which testing device is adapted to check the output of the respective line for an effective short-circuit, namely an effective resistance which is too low,
   b) for each of the two lines (L1, L2), there is further provided one switching device (5a, 5b) located between an input and an output of the respective line, and
   c) the switching devices (5a closed, 5b open) are respectively adapted to switch a connection (5a closed) between the input and the output of each respective one of the two lines (L1, L2), only after a test has been executed at the respective output by means of the respective short-circuit testing device (4) and if the test has proven the absence of a short-circuit.

13. Signaling output stage according to claim 6, wherein, in all said operating modes, when changing over from the high voltage level to the low voltage level, additionally the lower switching equipment (S3) is also open.

14. A circuit arrangement for providing digital voltage signals to plural electronic modules via a bus system, comprising:
   a first line and a second line that form a bus system;
   plural electronic modules connected to said first and second lines;
   signaling output stage that is connected to said first line and to said second line and thereby is connected via said lines to said electronic modules, wherein said signaling output stage comprises:
      a first voltage connection to a first voltage potential;
      a second voltage connection to a second voltage potential that is lower than said first voltage potential;
      a first switch interposed and connected between said first voltage connection and said first line;
      a second switch interposed and connected between said first line and said second line; and
      a third switch interposed and connected between said second voltage connection and said second line;
   a testing arrangement connected and adapted to test for and detect a respective fault condition on at least one of said first line and said second line; and
   a controller that is connected to said testing arrangement and to said first, second and third switches, and is adapted to control said switches in a manner dependent on and responsive to detection of said respective fault condition by said testing arrangement, so as to produce on said bus system digital voltage signals corresponding to potential differences between a first actual voltage that exists on said first line and a second actual voltage that exists on said second line.

15. The circuit arrangement according to claim 14, wherein, when said testing arrangement does not detect any said fault condition, said controller is adapted to control said switches in a normal operating mode in which a high voltage signal among said digital voltage signals is produced by closing said first switch and said third switch and opening said second switch, and in which a low voltage signal among said digital voltage signals is produced by at least opening said first switch.

16. The circuit arrangement according to claim 15, wherein, when said testing arrangement has detected said respective fault condition, and dependent on a particular nature of said respective fault condition, said controller is adapted to control said switches in a given fault operating mode in which said high voltage signal is produced by closing one and opening another of said first and third switches and opening said second switch.

17. The circuit arrangement according to claim 16, wherein said controller is adapted to control said second switch so as to close said second switch to produce said low voltage signal in all of said operating modes.

18. The circuit arrangement according to claim 14, wherein said controller is adapted to control said second switch so as to close said second switch to produce a low voltage signal among said digital voltage signals in all operating modes of said controller regardless whether said testing arrangement detects said respective fault condition.

19. The circuit arrangement according to claim 18, wherein said controller is adapted to control said second switch so as to open said second switch to produce a high voltage signal among said digital voltage signals in all said operating modes of said controller regardless whether said testing arrangement detects said respective fault condition.

20. The circuit arrangement according to claim 14, wherein said testing arrangement comprises a first current meter interposed in series with said first switch between said first voltage connection and said first line, a second current meter interposed in series with said second switch between said first line and said second line, and a third current meter interposed in series with said third switch between said second voltage connection and said second line.

21. The circuit arrangement according to claim 14, wherein said testing arrangement comprises a first voltage meter connected to said first line and a second voltage meter connected to said second line.

22. The circuit arrangement according to claim 14, wherein a given line among said first line and said second line is connected through a given module among said electronic modules via a line input and a line output of said given module, wherein said given module includes a short-circuit testing device and a switch device connected parallel to each other between said line input and said line output, and wherein said short-circuit testing device is connected to said switch device for control signal transmission thereto.

23. The circuit arrangement according to claim 14, wherein:
   said digital voltage signals include defined high and low voltage signals;
   said first and second voltage potentials are selected relative to each other and relative to an external third voltage potential and relative to said high and low voltage signals, so that a potential difference between said first and second voltage potentials, a potential difference between said second and third voltage potentials, and a potential difference between said first and third voltage potentials are all allocated to said high voltage signal;

said controller is adapted to control said switches in any of a normal operating mode, a second operating mode, a third operating mode and a fourth operating mode dependent on and responsive to whether said testing arrangement has detected said respective fault condition;

when said testing arrangement does not detect any said fault condition, said controller is adapted to control said switches in said normal operating mode in which said high voltage signal is produced by closing said first switch and said third switch and opening said second switch, and said low voltage signal is produced by at least opening said first switch;

when said testing arrangement detects a first type of said fault condition wherein said first line is shorted to said third voltage potential, said controller is adapted to control said switches in said second operating mode in which said high voltage signal is produced by closing said third switch and opening said second switch, and said low voltage signal is produced by opening said third switch and closing said second switch;

when said testing arrangement detects a second type of said fault condition wherein said second line is shorted to said third voltage potential, said controller is adapted to control said switches in said third operating mode in which said high voltage signal is produced by closing said first switch and opening said second switch, and said low voltage signal is produced by opening said first switch and closing said second switch; and when said testing arrangement detects a third type of said fault condition wherein said second line is shorted to said second voltage potential, said controller is adapted to control said switches in said fourth operating mode in which said high voltage signal is produced by closing said first switch and opening said second switch, and said low voltage signal is produced by opening said first switch and closing said second switch.

24. The circuit arrangement according to claim 23, wherein, in said normal operating mode, said low voltage signal is produced further by closing said third switch.

25. The circuit arrangement according to claim 23, wherein, in said fourth operating mode, said third switch is open for producing both said high voltage signal and said low voltage signal.

26. The circuit arrangement according to claim 23, wherein, in said second operating mode, said first switch is open for producing both said high voltage signal and said low voltage signal.

27. The circuit arrangement according to claim 23, wherein, in said third operating mode, said third switch is open for producing both said high voltage signal and said low voltage signal.

28. The circuit arrangement according to claims 14, wherein, when said first, second and third switches are said first and second lines are free of any potential and are not shorted to ground.

29. The circuit arrangement according to claims 14, wherein said second voltage potential is a ground potential.

30. The circuit arrangement according to claim 14, wherein said electronic modules are each respectively connected to said first line and to said second line, and are arranged parallel to each other between said first line and said second line.

31. A method of generating digital high and low voltage signals on a bus including a first line and a second line, comprising the steps:

a) detecting whether a first line short fault exists on said first line;

b) detecting whether a second line short fault exists on said second line;

c) when neither said first line short fault nor said second line short fault is detected, then selectively generating said high voltage signal and said low voltage signal according to a normal operating mode, wherein said high voltage signal is generated by connecting said first line to a first voltage potential, connecting said second line to a second voltage potential, and disconnecting said first and second lines from each other, and wherein said low voltage signal is generated by disconnecting said first line from said first voltage potential and connecting said first and second lines to each other;

d) when said first line short fault is detected, then selectively generating said high voltage signal and said low voltage signal according to a first fault operating mode, wherein said high voltage signal is generated by connecting said second line to said second voltage potential and disconnecting said first and second lines from each other, and wherein said low voltage signal is generated by disconnecting said second line from said second voltage potential and connecting said first and second lines to each other; and e) when said second line short fault is detected, then selectively generating said high voltage signal and said low voltage signal according to a second fault operating mode, wherein said high voltage signal is generated by connecting said first line to said first voltage potential and disconnecting said first and second lines from each other, and wherein said low voltage signal is generated by disconnecting said first line from said first voltage potential and connecting said first and second lines to each other.

32. The method according to claim 31, wherein:

in said normal operating mode, said low voltage signal is generated further by connecting said second line to said second voltage potential;

said first fault operating mode further involves disconnecting said first line from said first voltage potential both when generating said low voltage signal and when generating said high voltage signal; and said second fault operating mode further involves disconnecting said second line from said second voltage potential both when generating said low voltage signal and when generating said high voltage signal.

* * * * *

UNITED STATES PATENT AND TRADEMARK OFFICE
CERTIFICATE OF CORRECTION

PATENT NO. : 6,823,020 B1
DATED : November 23, 2004
INVENTOR(S) : Fendt et al.

It is certified that error appears in the above-identified patent and that said Letters Patent is hereby corrected as shown below:

Title page,
Item [54], Title, replace to read, -- DIFFERENTIAL OUTPUT STAGE FOR FAULT TOLERANT GENERATION OF DIGITAL SIGNALS ON A BUS SYSTEM --.
Item [30], Foreign Application Priority Data, before "(DE)", replace "Mar. 19, 1998" by -- Mar. 28, 1998 --.

Drawings,
Please replace Sheet 2 of 3 of the drawings by the attached drawing Sheet 2 of 3.

Column 1,
Lines 2 to 4, replace these lines to read -- Differential Output Stage for Fault Tolerant Generation of Digital Signals on a Bus System --.

Column 6,
Line 45, after "to", replace "p2" by -- $\Phi 2$ --.
Lines 61 and 62, replace to read -- namely the short-circuit of L1 to $\varphi 2$ as well as that of L2 to $\varphi 1$, that is, the respective --.

Column 9,
Line 49, before "signaling", insert -- a --.

Column 11,
Line 61, after "are", insert -- open, --.

Signed and Sealed this

Fifth Day of April, 2005

JON W. DUDAS
*Director of the United States Patent and Trademark Office*

| | $L_1, L_2$ = FLOAT. $B_1$ | | | $L_1 = \varphi_3$ $B_2$ | | $L_2 = \varphi_3$ $B_3$ | | $L_2 = \varphi_2$ $B_4$ | |
|---|---|---|---|---|---|---|---|---|---|
| | HIGH | → | LOW | HIGH | LOW | HIGH | LOW | HIGH | LOW |
| $S_1$ | CLOSED | OPEN | OPEN | OPEN | OPEN | CLOSED | OPEN | CLOSED | OPEN |
| $S_2$ | OPEN | CLOSED | CLOSED | OPEN | CLOSED | OPEN | CLOSED | OPEN | CLOSED |
| $S_3$ | CLOSED | CLOSED | CLOSED | CLOSED | OPEN | OPEN | OPEN | OPEN | OPEN |

FIG. 2

| | | $L_1$ | | | |
|---|---|---|---|---|---|
| | | FLOAT. | $\varphi_1$ | $\varphi_2$ | $\varphi_3$ |
| $L_2$ | FLOAT. | $B_1$ | $B_2$ | x | $B_2$ |
| | $\varphi_1$ | x | x | x | x |
| | $\varphi_2$ | $B_4$ | x | x | x |
| | $\varphi_3$ | $B_3$ | x | x | x |